United States Patent

Ray et al.

[11] 4,360,770
[45] Nov. 23, 1982

[54] VARIABLE RELUCTANCE MOTOR SYSTEMS

[75] Inventors: William F. Ray, Attenborough; Rex M. Davis, East Leake, both of England

[73] Assignee: Chloride Group Public Limited Company, London, England

[21] Appl. No.: 187,837

[22] PCT Filed: May 24, 1979

[86] PCT No.: PCT/GB79/00079
§ 371 Date: Jan. 10, 1980
§ 102(e) Date: Jan. 10, 1980

[87] PCT Pub. No.: WO79/01133
PCT Pub. Date: Dec. 27, 1979

[51] Int. Cl.³ .............................................. H02P 5/16
[52] U.S. Cl. .................... 318/701; 318/254; 318/138
[58] Field of Search ................ 318/701, 138, 139, 254

[56] References Cited

U.S. PATENT DOCUMENTS

| 3,401,323 | 9/1968 | French | 318/254 |
| 3,560,817 | 2/1971 | Amato | 318/139 |
| 3,560,818 | 2/1971 | Amato | 318/139 |
| 3,560,820 | 2/1971 | Unnewehr | 318/139 |
| 3,697,839 | 10/1972 | Unnewehr | 318/701 |
| 3,697,840 | 10/1972 | Koch | 318/254 |
| 3,714,533 | 1/1973 | Unnewehr | 318/254 |
| 3,956,678 | 5/1976 | Byrne et al. | 318/254 |
| 4,143,308 | 3/1979 | DePlante et al. | 318/701 |
| 4,253,053 | 2/1981 | Ray et al. | 318/254 |

FOREIGN PATENT DOCUMENTS 2094313  2/1972  France .

Primary Examiner—David Smith, Jr.
Attorney, Agent, or Firm—Oblon, Fisher, Spivak, McClelland & Maier

[57] ABSTRACT

A variable reluctance motor control system has for each main phase winding (11) a power converter circuit including a main thyristor (12) across a D.V. source (50) and a commutating circuit including a capacitor (51,52) and a commutating thristor (16), arranged to resonantly reverse the charge on the capacitor in preparation for energizing the next main phase winding (21) by passing a current through the other main phase winding.

16 Claims, 5 Drawing Figures

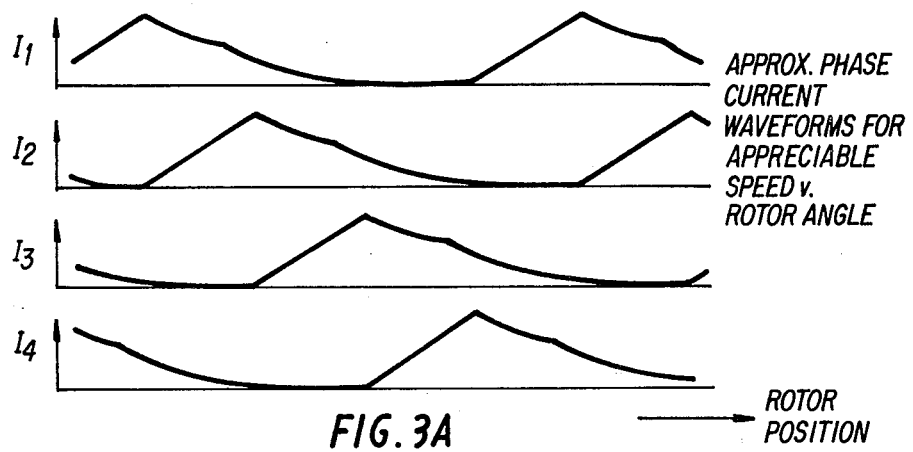
FIG. 3A — APPROX. PHASE CURRENT WAVEFORMS FOR APPRECIABLE SPEED v. ROTOR ANGLE
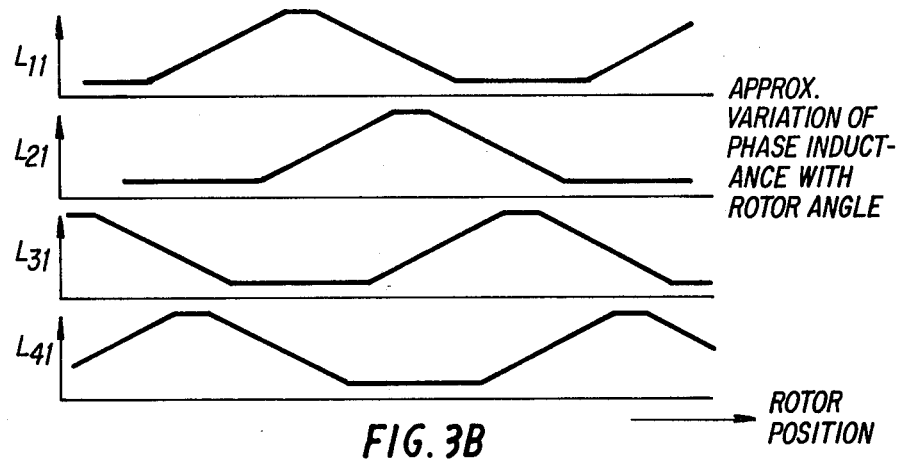
FIG. 3B — APPROX. VARIATION OF PHASE INDUCTANCE WITH ROTOR ANGLE
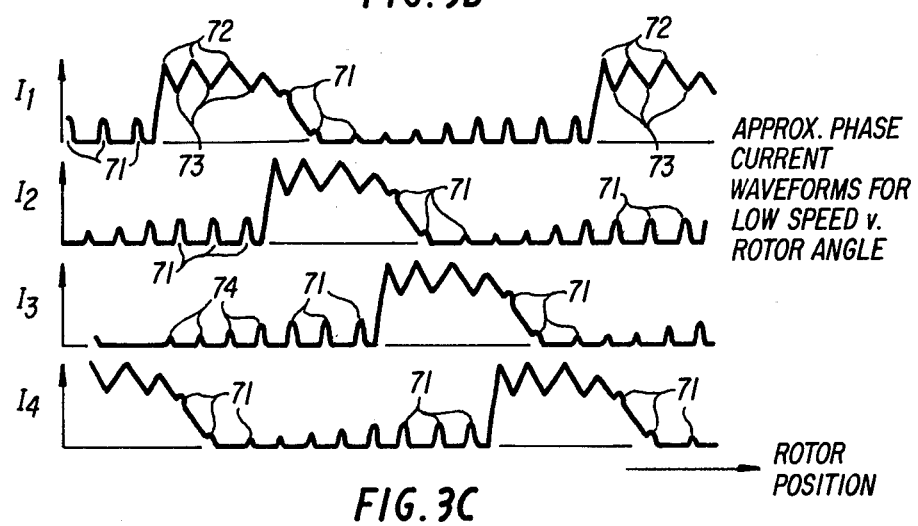
FIG. 3C — APPROX. PHASE CURRENT WAVEFORMS FOR LOW SPEED v. ROTOR ANGLE

VARIABLE RELUCTANCE MOTOR SYSTEMS

BACKGROUND OF THE INVENTION

1. Field of the Invention

This invention relates to variable reluctance motor systems of the type including a variable reluctance motor having a main winding for each of a number of phases and a power converter circuit including a main thyristor in series with each main winding of the motor across a d.v. source from which the main windings are supplied with unidirectional current pulses sequentially, and a commutating circuit including a capacitor for commutating the main thyristors.

2. Description of the Prior Art

Known commutating circuits, having performed their turn-off function for a particular thyristor, leave the commutating capacitor or capacitors charged with a polarity which is opposite to that required to turn-off the same thyristor again or to turn-off the next thyristor in the sequence of thyristor conduction. An additional thyristor in series with an inductor is necessary forming a resetting circuit through which a half cycle of current flows whereby the polarity of the capacitors is reversed.

SUMMARY OF THE INVENTION

According to the present invention, the resetting circuit is arranged to resonantly reverse the charge on the said capacitor by passing a current through the motor winding of another phase.

For a range of motor speeds, especially at standstill and at low speed, it is necessary to adopt a chopping mode in which a main thyristor of one phase is fired and turned off several times before that of another phase is fired, so as to maintain current in a particular phase winding between desired limits and thus to develop the desired motor torque.

The present invention is particularly applicable to a system when working in the chopping mode. Thus the commutating circuit may embody one or more commutating capacitors common to two main thyristors connected to opposite source terminals, and commutating thyristors associated respectively with the said main thyristors, and, for operation in a chopping mode, means for firing a main thyristor, means for then firing the associated commutating thyristor to commutate the main thyristor, while reversing the capacitor charge, and, for resetting the capacitor charge, means for firing the commutating thyristor of another phase to effect resonant reversal of the capacitor through the winding of the other phase.

The invention may conveniently be applied to variable reluctance motors having a main winding and a closely coupled auxiliary winding for each phase, or to such motors having a single winding for each phase in which case one end of every winding is connected together and connected to a mid-tapping on the d.v. source.

When the motor has main and auxiliary windings the phase current referred to hereafter is defined as the sum of the main winding current and m times the auxiliary winding current where m is the ratio of the auxiliary to main winding turns. The present invention has the advantage that it avoids the need for a resetting circuit formed by an additional thyristor and inductor in series, and so eliminates the power losses associated with this circuit.

In one form of the invention the commutating circuit common to two phases having main thyristors connected to opposite source terminals has a junction point connected to the junction of the main thyristor and main winding of a first phase through a commutating thyristor arranged when fired to divert current flowing through the winding to flow into the commutating circuit to turn off the main thyristor while making the junction points of the commutating circuit more positive, in preparation for commutating the main thyristor of the second phase, while the junction of the main winding and main thyristor of the second phase is connected to a junction point of the commutating circuit through a commutating thyristor arranged when fired to divert current flowing through the winding to flow out of the commutating circuit to turn off the main thyristor while making the junction points of the commutating circuit more negative, in preparation for commutating the main thyristor of the next phase.

In one arrangement both phases are connected to the same junction point of the commutating circuit. Thus the commutating circuit may comprise two capacitors connected in series between the terminals of a source common to both phases.

In another arrangement the source is centre tapped and the main winding of each phase is the only motor winding, and has one end connected to the centre tapping, with the remote terminal of main thyristors of alternate phases connected to each terminal of the source and the junction of the main winding and main thyristor connected through a regenerating diode to the opposite terminal of the source.

Successive phases may be connected to junction points of the commutating circuit between which a substantially constant potential difference is maintained. Thus the commutating circuit may comprise a pair of capacitors connected in series between the terminals of the combined source with a device maintaining a substantially constant potential difference interposed between them. The device maintaining a constant potential difference may comprise a battery, or it may comprise a relatively large capacitor connected to each terminal of the course through an inductor, or connected to an isolating D.C.-D.C. converter from the source.

BRIEF DESCRIPTION OF THE DRAWINGS

Further features and details of the invention will be apparent from the following description of certain specific embodiments, given by way of example with reference to the accompanying drawings in which;

FIG. 3, divided into FIGS. 3A, 3B and 3C, is a graph showing waveforms; and

DESCRIPTION OF PREFERRED EMBODIMENTS

The arrangements shown, when operating in the high speed-single commutation per cycle mode incorporate the invention set forth in our co-pending British patent application No. 22893/78.

Figure 1:
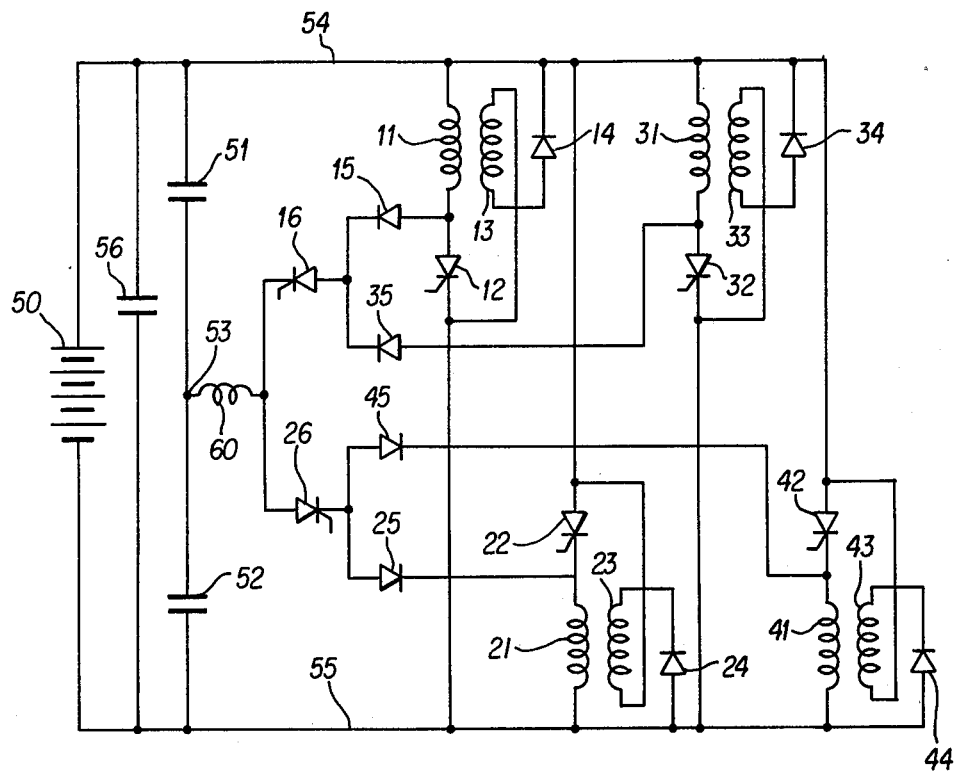
FIG. 1 is a circuit diagram of one form of variable reluctance motor system embodying the invention.
Figure 2:
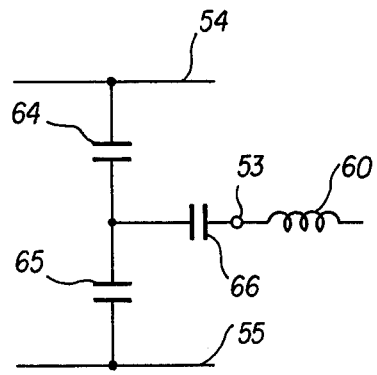
FIG. 2 is a diagram of a slight modification of part of FIG. 1.

The arrangement shown in FIG. 1 is particularly suitable for low voltage motors in which space is available for bifilar windings to provide a main winding and an auxiliary winding for each phase of the motor. The system incorporates a four phase motor having a main winding 11, 21, 31 or 41 for each phase connected in series with a main thyristor 12, 22, 32 or 42 across the supply terminals of a battery 50. Each main winding is closely coupled to an auxiliary winding 13, 23, 33 or 43 connected across the supply in series with a diode 14, 24, 34, or 44. The junction of each main winding with its main thyristor is connected through one of four diodes 15, 25, 35 or 45 to one of two commutating thyristors 16 or 26 to the junction point 53 of a commutating circuit comprising a pair of capacitors 51 and 52 connected across the supply terminals. The supply terminals are shown connected also to a capacitor 56 which reduces the alternating components of current in the battery. The three capacitors 56, 51 52 of FIG. 1 may be replaced by three capacitors 64, 65 and 66 of FIG. 2. It is also necessary to include one or more inductors to protect thyristor 16 26 against excessive di/dt at turn-on and a single inductor 60 is shown to fulfill this function.

Each phase is arranged in a generally conventional manner and the operation of each phase is also generally conventional, that is to say the main thyristor 12 of phase 1 is fired to allow a current to build up in the main winding 11.

In order to terminate the current in the main winding, the main thyristor is commutated by firing the commutating thyristor 16, the point 53 being at a negative potential with respect to the point 54 so that the current in the winding 11 is diverted by the thyristor 16 through the inductor 60 and the capacitors 51 and 52, allowing the thyristor 12 to switch off. The voltage at the junction 53 of the capacitors becomes progressively more positive until the current transfers from the main winding 11 to the auxiliary winding 13 so as to feed energy back into the supply. This gives the thyristor 16 the opportunity to turn off.

At this point in the operation the arrangement differs from the conventional arrangement. It will be noted that the voltage at the junction 53 of the capacitors is now positive with respect to the point 54 so that the commutating circuit is incapable of repeating the commutation of a phase arranged like the first phase. In conventional arrangements, a separate resetting circuit is provided comprising a resetting thyristor in series with an inductor connected between the point 53 and a convenient point in the circuit having a fixed potential, for example a mid-point on the battery 50. When the resetting thyristor is fired, a pulse of current flows through it to effect resonant reversal of the voltage across the capacitor.

It will be noted that whereas the main winding 11 of the first phase is connected to the positive supply terminal 54 and its thyristor to the negative supply terminal 55 the main winding 21 of the second phase is connected to the negative supply terminal 55, whilst its thyristor 22 is connected to the positive terminal 54. Accordingly, the second phase requires the junction 53 of the capacitors to be at a positive voltage with respect to the point 54 in order to commutate it, and this is the state in which capacitors are left after the commutation of the first phase has been completed. In other respects, the operation of the second phase follows that of the first phase with the polarities reversed, whilst the third phase follows with the same polarities as the first and the fourth phase follows with the same polarities as the second.

The operation may be considered in somewhat more details and since the circuit is completely symmetrical it is appropriate to consider the positive supply terminal voltage as being $+E/2$ and the negative supply terminal voltage as being minus $E/2$, zero voltage corresponding to a fictitious midtapping of the supply.

The effective capacitor voltage VC is taken to be the voltage at the point 53 with respect to zero voltage.

Prior to the commutation of the current from the main winding 11 to the auxiliary winding 13 the capacitor voltage VC has been set to $VC = -[3E/2 + \Delta V1]$ The commutation occurs as follows: On firing the commutating thyristor 16 the main thyristor 12 is reverse biased and current $I_{11}$ flows through the commutating thyristor into the capacitors so that VC increases positively. The reverse voltage time for the main thyristor 12 is sufficiently long for it to turn off. When VC equals $3E/2$ the diode 14 becomes forward biased due to the transformer action of the closely coupled main and auxiliary windings having unity turns ratio and the main winding current I11 transfers to the auxiliary winding 13. The transfer is not instantaneous due to imperfect coupling between the windings and resultant leakage inductance so that for a short period of time, a decreasing current continues to flow through the commutating thyristor 16 so that VC is further increased to $3E/2 + \Delta V1$.

It will be noted that in the conventional arrangement each time the commutating circuit is used the commutating capacitor must undergo two reversals of charge. On the other hand, according to the present invention it only undergoes a single reversal of charge, which leaves it in the required state to commutate the next phase. Thus at the end of commutation, the capacitor point 53 is left at $VC = +3E/2 + \Delta V1$.

FIGS. 3A and 3B show typical waveforms of phase current and inductance when running at appreciable speed indicating the magnitude and angular duration of phase current. The motor operates over the majority of its speed range in a single commutation mode which involves only one commutation for each phase during each cycle, and the fact that the resonant reversal of the commutating capacitor voltage by a resetting circuit is not required throughout this range means that a source of energy loss is eliminated and gives greater efficiency. In addition the thyristor and inductor required for a capacitor resetting circuit are eliminated.

In the high speed range, with the above single commutation mode, the rate at which the winding current i builds up is controlled by the inductance L of the winding and by its rate of increase dL/dt according to the equation.

$$\frac{di}{dt} = \frac{T}{L}\left[E - Ri - i\frac{dL}{dt}\right]$$

where R is the winding resistance and E is the battery voltage.

As the motor speed reduces, DL/dt reduces and the time for a cycle increases, both effects resulting in the winding current reaching an increasingly high value for particular choices of the rotor angles at which the main thyristor is turned on and commutated.

Accordingly in a low speed range from standstill upwards, a chopping mode is adopted and the main thyristor is commutated each time the phase current rises to a predetermined higher value and fired again each time the phase current sinks to a predetermined lower value, so that a number of commutations are performed on a particular phase before any are performed on the following phase. FIG. 3C shows a diagrammatic graph of the sort of shape of such phase currents.

Accordingly, it will be appreciated, that for operating with the chopping mode several consecutive commutations are required for each phase and hence for all but the last of these it is necessary to reset the commutating capacitor voltage by resonant reversal. It is not however necessary to provide a separate resonant reversal thyristor and inductor for this purpose as the result may be achieved by the method in accordance with the present invention.

Thus after the main thyristor 12 has been commutated and the current $I_{11}$ has transferred as described above from the main winding 11 to the auxiliary winding 13 of phase 1, the main and commutating thyristors 12 and 16 have turned off. When the phase current has fallen to a lower predetermined level the main thyristor 12 is fired again thereby transferring the phase current back to the main winding. At or approximately at the same time that the thyristor 12 is refired, the commutating thyristor 26 of the second and fourth phases is also fired. The main windings of phases two and four are now effectively in parallel and act in the same way as the resonant reversal inductor for a conventional arrangement. Thus the voltage of the commutating capacitor is now resonantly reversed from $VC = +3E/2 + V1$ to approximately $VC = -[3E/2]$, VC being limited to $-3E/2$ by the clamping action of the auxiliary windings 23 and 43 whose diodes 24 and 44 become forward biased when $VC \leq 3E/2$.

The use of adjacent phase windings for resonant reversal of the commutation capacitors gives rise to current pulses in these windings as shown at 71 in FIG. 3C but these do not interfere with the operation of these phases of which the main thyristors 22 and 42 are not at this time conducting.

Additional current pulses 74 arise in each phase caused by the commutations 72 of the other thyristor connected to the same source terminal.

The next commutation of thyristor 12 cannot take place until the previous resonant reversal of VC has been completed and the commutating thyristor 26 has had sufficient time to turn off. During this period of current $I_{11}$ in the main winding will be increasing. A pertinent question is whether the resonant reversal will be sufficiently fast, using the motor windings themselves in lieu of a resonant reversal inductor, so that when the current $I_{11}$ has built up to the level at which commutation is required the thyristor 26 is off and the thyristor 16 may be fired.

It will be seen from FIGS. 3B and 3C that during the chopping of current in phase 1, phase 2 has its minimum inductance value, and, since the time for resonant reversal is proportional to $\sqrt{L}$, this is most beneficial for a fast reversal.

It may be shown that for a typical reluctance motor application even using thyristors with relatively slow turn-off times (compared with known conventional inverter grade thyristors), current waveforms of the type shown in FIG. 3C may be achieved.

It will also be seen from FIGS. 3B and 3C that when the inductance of a phase 1 has built up to a value approaching its maximum due to rotor rotation it is desirable to terminate the current in phase 1 and to build up current in phase 2.

Hence at or approximately at the same time that the commutating thyristor 16 is fired for the final commutation of the main thyristor 12 in phase 1, the main thyristor 22 is fired to build up current in phase 2. However the second phase requires the junction 53 of the capacitors to be at a positive voltage in order to commutate thyristor 22, and this is the state in which the capacitors are left after this commutation of thyristor 12. Hence when the main thyristor 22 is initially fired to build up current in phase 2 no resetting of the voltage VC is required, resetting only being required for the second and subsequent commutations in any given phase. In other respects the operation of the second phase follows that of the first phase with the polarities reversed, whilst the third phase follows with the same polarities as the first and the fourth phase follows with the same polarities as the second.

Priming of the power converter circuit of FIG. 1 when first connected to the source is also effected, as will now be described without the need for additional components.

When the circuit is first connected to the source, the voltage VC on the commutating capacitors at point 53 will become approximately zero, the positive and negative terminal voltages of the source being $+E/2$ and $-E/2$ respectively. Depending on which main thyristor is to be first fired, it is necessary to preset VC to approximately $-3E/2$ or $+3E/2$.

VC may be set to $-3E/2$ by initially firing the commutating thyristor 16, when current will flow through main windings 11 and 31 to resonantly charge VC to approximately $+E$. After the thyristor 16 has turned off, the commutating thyristor 26 is fired, when current flows through main windings 21 and 41 to resonantly reverse VC, VC being eventually held at approximately $-3E/2$ by the clamping action of the auxiliary windings 23 and 43 and diodes 24 and 44 as previously described. The commutating capacitor voltage is now preset to such a value that it may be used to turn off the main thyristors 12 or 32 when either of these is fired.

VC may similarly be preset to $+3E/2$ by firing the commutating thyristor 26 followed by firing the commutating thyristor 16.

The arrangement shown in FIG. 1 involves slight additional capacitor cost as compared with a conventional arrangement but this is greatly outweighed by the advantages of having no resonant inductor and thyristor, reduced voltage ratings for commutating thyristors and main diodes, and a greater circuit efficiency.

In a modification of FIG. 1 the diodes 15, 25, 35 and 45 and thyristors 16 and 26 are replaced by four thyristors, in the positions of the diodes, with their terminals remote from the main windings connected to the end of the inductor 60 remote from the point 53. In this case the pulses 71 and 74 of FIG. 3C may be absent.

Figure 4:
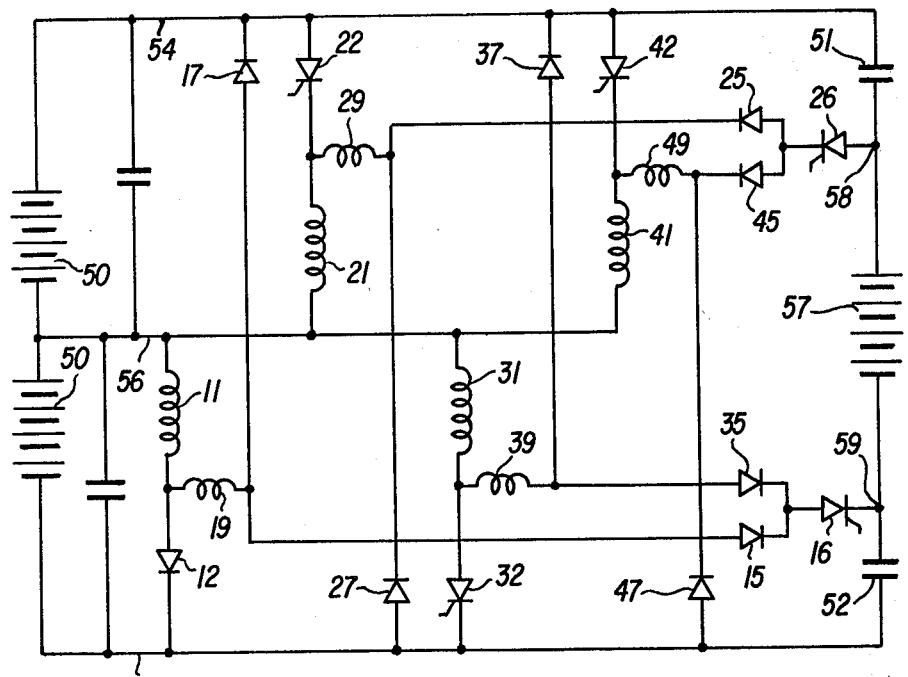
FIGS. 4 & 5 are circuit diagrams respectively of further modifications.

For high voltage high power motors it may be desirable from the point of view of compactness to eliminate auxiliary windings, and FIG. 4 shows an arrangement in which this is effected.

The arrangement of FIG. 4 differs from the arrangement of FIG. 1 in employing a direct voltage source 50 centre-tapped at 56 with the winding and main thyristor of the first and third phases connected across one half of it and those of the second and fourth phases connected across its other half. Each winding has one terminal connected to the centre tapping 56. The winding voltages are thus one half of those associated with FIG. 1 during main thyristor conduction.

In addition the arrangement of FIG. 4 employs a second direct voltage source 57 of voltage EA and much lower power rating connected between the two commutating capacitors 51 and 52. The commutating thyristor 16 of phases one and three is connected to the negative terminal 59 of the second dv source 57 whilst the commutating thyristor 26 of phases two and four is connected to its positive terminal 58. In addition the junction of each motor winding and its main thyristor is connected through an inductor 19, 29, 39 or 49 and a diode 17, 27, 37 or 47 to the remote supply terminal, that is to say the junctions of phases one and three are connected through main inductors 19 and 39 and diodes 17 and 37 to the positive terminal 54, and the junctions of phases two and four are connected through their inductors 29 and 49 and diodes 27 and 47 to the negative terminal 55.

The operation is analagous to that of FIG. 1 and a brief description will, it is thought, suffice.

For operation in the single commutation per cycle mode, the negative terminal 59 of the auxiliary supply 57 is initially at a potential $-E/2-EA$ when the main thyristor 12 of phase 1 is fired. The thyristor 12 is turned off when the commutating thyristor 16 is fired. The winding current now flows through the inductor 19, commutating diode 15 and thyristor 16 and to the capacitor 52 and via the auxiliary supply 57 to the capacitor 51. The voltage of the point 59 increases until the auxiliary diode 17 conducts when the point 59 is at a potential of $+E/2$ which means that the point 58 is at a potential $+E/2+EA$. The second phase main thyristor 22 may be fired at any time provided that by the time it is to be turned off the point 58 has reached the potential $+E/2+EA$ referred to above. This is the potential and polarity required to commutate the second phase.

For the chopping mode, the point 59 is initially at a potential of $-E/2-EA$. The first phase main thyristor 12 is fired, and when the current reaches the desired predetermined maximum value the commutating thyristor 16 is fired. Current flows via the inductor 19, commutating diode 15 and thyristor 16 and to the capacitor 52, and to the capacitor 51 through the auxiliary source 57. The potential of the point 59 increases until the diode 17 conducts when the point 59 is at $+E/2$ and the point 58 is therefore at $+E/2+EA$. After the thyristor 16 has recovered the commutating thyristor 26 of the second and fourth phases is fired to effect resonant reversal of the capacitors using the main windings 21 and 41 of the second and fourth phases so that the potential of the point 58 oscillates from $+E/2+EA$ to approximately $-E/2$. Thus the potential of the point 59 must be driven to $-E/2-EA$, equal to its initial value. The main thyristor 12 of phase one may be fired at any time provided that by the time that it is to be turned off the point 59 has reached this potential $-E/2-EA$.

For priming the power converter circuit of FIG. 4 it is necessary to preset the voltage V58 at the point 58 to $-E/2$ if either main thyristor 12 or 32 is to be fired first, or to preset the voltage V59 at the point 59 to $+E/2$ if either main thyristor 22 or 42 is to be fired first.

When the power converter circuit of FIG. 4 is first connected to the source the voltages V58 and V59 will be approximately $+EA/2-EA/2$ respectively, where EA is the voltage of the auxiliary source 57.

To set V58 to $-E/2$, the commutating thyristor 16 is fired when current will flow through motor windings 11 and 31 such that V58 is resonantly reversed to $+EA/2$ and V59 becomes $+3EA/2$. The commutating thyristor 26 is then fired so as to resonantly reverse V58, current flowing through motor windings 21 and 41. Provided EA is sufficiently greater than E/3, V58 will reach $-E/2$ in which case the diodes 27 and 47 will clamp V58 at $-E/2$. V59 will now be $-E/2-EA$, which is of sufficient value to turn off main thyristor 12 or 32 when either of these is fired.

V59 may similarly be preset to $+E/2$ by firing the commutating thyristor 26 followed by the commutating thyristor 16, after which V58 will be $+E/2+EA$ which is of sufficient value to turn off the main thyristor 22 or 42 when either of them is fired.

The second direct voltage source 57 may be provided from the battery 50 via a subsidiary power converter or via similar isolating circuitry of known design.

In a modification of FIG. 4 (not illustrated) the diodes 15, 25, 35 and 45 and thyristors 16 and 26 are replaced by four thyristors in the positions of the diodes, and whose terminals remote from the main windings are connected to the point 59 for the commutating thyristors for phases 1 and 3 and to point 58 for those for phases 2 and 4.

Figure 5:
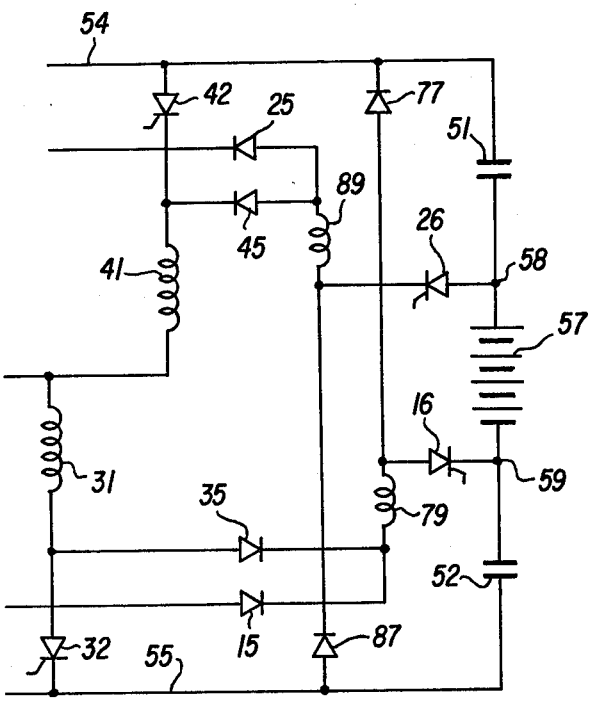

In another modification of FIG. 4 shown in FIG. 5, diodes 17 and 37 are replaced by a single diode 77 between the supply terminal 54 and the cathodes of the diodes 15 and 35, and diodes 27 and 47 are replaced by a single diode 87 between the supply terminal 55 and the anodes of the diodes 25 and 45. This modification permits the two inductors 19 and 39 to be replaced by a single inductor 79 in series with the diode 77 and the two inductors 29 and 49 to be replaced by a single inductor 89 in series with the diode 87.

We claim:

1. A variable reluctance electric motor system comprising:
   a variable reluctance motor having a main winding for each of a number of phases;
   a power converter circuit including a main thyristor in series with each main winding of the motor across a d.v. source for sequentially supplying each main winding with unidirectional current pulses independently of the other main windings;
   a commutating circuit including a capacitor for commutating the main thyristor of one phase; and
   a resetting circuit arranged to resonantly reverse the charge on the said capacitor by passing a current through the motor winding of another phase.

2. A variable reluctance electric motor system comprising:
   a variable reluctance motor having a main winding for each of a number of phases;
   a power converter circuit including a main thyristor in series with each main winding of the motor across the d.v. source for sequentially supplying each main winding with unidirectional current pulses independently of the other main windings;
   a commutating circuit embodying one or more commutating capacitors, to two main thyristors connected to opposite source terminals;
   commutating thyristors associated respectively with the said main thyristors, and, for operation in a chopping mode;
   means for firing a main thyristor;
   means for then firing the associated commutating thyristor to commutate the main thyristor, while reversing the capacitor charge, and for resetting the capacitor charge;

means for firing the commutating thyristor of another phase to effect resonant reversal of the capacitor charge through the winding of said other phase.

3. A system as claimed in claim 2 in which the commutating circuit common to two phases having main thyristors connected to opposite source terminals has a junction point connected to the junction of the main thyristor and main winding of a first phase through a commutating thyristor arranged when fired to divert current flowing through the winding into the commutating circuit to turn off the main thyristor while making the junction points of the commutating circuit more positive, in preparation for commutating the main thyristor of the second phase, while the junction of the main winding and main thyristor of the second phase is connected to a junction point of the commutating circuit through a commutating thyristor arranged when fired to divert current flowing through the winding out of the commutating circuit to turn off the main thyristor while making the junction points of the commutating circuit more negative, in preparation for commutating the main thyristor of the next phase.

4. A system as claimed in claim 3 in which both phases are connected to the same junction point of the commutating circuit.

5. A system as claimed in claim 4 in which the commutating circuit comprises two capacitors connected in series between the terminals of a source common to both phases.

6. A system as claimed in any one of the preceding claims in which each phase of the motor also has an auxiliary winding closely coupled to the main winding and connected across the source in series with a diode so as to return energy to the source.

7. A system as claimed in claim 1 or claim 2 in which the source is centre tapped, the main winding of each phase is the only motor winding, and has one end connected to the centre tapping, with the remote terminal of main thyristors of alternate phases connected to each terminal of the source and the junction of the main winding and main thyristor connected through a regenerating diode to the opposite terminal of the source.

8. A system as claimed in claim 7 in which the source is centre-tapped and the main thyristors of alternate phases are connected to each half of the supply.

9. A system as claimed in claim 8 in which successive phases are connected to junction points of the commutating circuit between which a substantially constant potential difference is maintained.

10. A system as claimed in claim 9 in which the commutating circuit comprises a pair of capacitors connected in series between the terminals of the combined supply with a device maintaining a substantially constant potential difference interposed between them.

11. A system as claimed in claim 9 in which the device maintaining a constant potential difference comprises a battery.

12. A system as claimed in claim 9 in which the device maintaining a constant potential difference comprises a relatively large capacitor connected to each terminal of the supply through an inductor.

13. A system as claimed in any one of claims 8 to 12 in which the junction of the main winding and main thyristor is connected to the commutating circuit through an inductor to limit the rate of change of current.

14. A system as claimed in any one of claims 8 to 12 in which the junction of the main winding and main thyristor of each phase is connected through an inductor to the remote terminal of the supply to limit the rate of diversion of current.

15. A system as claimed in any one of the preceding claims comprising four phases, each having the junction of its main winding and main thyristor connected to the commutating circuit through an individual diode and a commutating thyristor common to it and another phase having its main thyristor connected to the same source terminal.

16. A variable reluctance electric motor system as specifically described herein with reference to any one of FIGS. 1, 2, 4 or 5, and FIG. 3 of the accompanying drawings.

* * * * *

UNITED STATES PATENT AND TRADEMARK OFFICE
CERTIFICATE OF CORRECTION

PATENT NO. : 4,360,770

DATED : November 23, 1982

INVENTOR(S) : William Ray et al.

It is certified that error appears in the above-identified patent and that said Letters Patent is hereby corrected as shown below:

On the title page
Please insert the following priority data:

[30] -- Foreign Application Priority Data

May 26, 1978   [GB]   Great Britain....22892/78 --

Signed and Sealed this

*Eighth* Day of *February 1983*

[SEAL]

*Attest:*

GERALD J MOSSINGHOFF

*Attesting Officer*   *Commissioner of Patents and Trademarks*